(12) United States Patent
Chen

(10) Patent No.: US 6,499,960 B2
(45) Date of Patent: Dec. 31, 2002

(54) CONTROL CIRCUIT FOR A HEAT-DISSIPATION FAN

(75) Inventor: Chien-Jung Chen, Kaohsiung Hsien (TW)

(73) Assignee: Yen Sun Technology Corp., Kaohsiung Hsien (TW)

( * ) Notice: Subject to any disclaimer, the term of this patent is extended or adjusted under 35 U.S.C. 154(b) by 85 days.

(21) Appl. No.: 09/842,639

(22) Filed: Apr. 27, 2001

(65) Prior Publication Data

US 2001/0024615 A1 Sep. 27, 2001

Related U.S. Application Data

(63) Continuation-in-part of application No. 09/493,617, filed on Jan. 28, 2000.

(51) Int. Cl.[7] .................................................. F04B 49/10
(52) U.S. Cl. ........................................ 417/32; 165/80.3
(58) Field of Search .......................... 417/45, 44.1, 32, 417/14; 361/695, 697, 688, 701; 165/80.3

(56) References Cited

U.S. PATENT DOCUMENTS

| | | | | |
|---|---|---|---|---|
| 4,205,944 A | * | 6/1980 | Rohrberg et al. | 417/32 |
| 4,832,576 A | * | 5/1989 | Deguchi et al. | 417/45 |
| 5,010,739 A | * | 4/1991 | Isshiki et al. | 62/158 |
| 5,066,197 A | * | 11/1991 | Champagne | 417/18 |
| 5,079,488 A | * | 1/1992 | Harms et al. | 318/471 |
| 5,144,366 A | * | 9/1992 | Sakamoto et al. | 355/208 |
| 5,252,030 A | * | 10/1993 | Chikada | 417/12 |
| 5,254,035 A | * | 10/1993 | Kiuchi | 454/343 |
| 5,449,275 A | * | 9/1995 | Gluszek et al. | 417/14 |
| 5,491,610 A | * | 2/1996 | Mok et al. | 361/695 |
| 5,875,965 A | * | 3/1999 | Lee | 236/446 |
| 5,906,315 A | * | 5/1999 | Lewis et al. | 236/49.3 |
| 6,047,766 A | * | 4/2000 | Van Brocklin et al. | 165/104.26 |
| 6,089,463 A | * | 7/2000 | Hiroi | 236/49.3 |
| 6,147,465 A | * | 11/2000 | Hollenbeck | 318/254 |
| 6,297,607 B1 | * | 10/2001 | Becker | 318/471 |

* cited by examiner

Primary Examiner—Charles G. Freay
Assistant Examiner—W Rodriguez
(74) Attorney, Agent, or Firm—Larson & Taylor, PLC

(57) ABSTRACT

A control circuit for controlling the rotational speed of a heat-dissipation fan for an electronic device, the circuit including a temperature sensing circuit for sensing the ambient temperature of the device and providing a temperature signal, a comparator circuit for receiving the temperature signal and for comparing it with a predetermined threshold, and a drive circuit for receiving the comparison signal and for controlling the rotational speed of the fan so that, when the ambient temperature is above the threshold, the speed changes substantially linearly with respect to the difference between the ambient temperature and the threshold and, when the ambient temperature is below the threshold, the fan is stopped.

4 Claims, 1 Drawing Sheet

CONTROL CIRCUIT FOR A HEAT-DISSIPATION FAN

CROSS-REFERENCE TO RELATED APPLICATIONS

This application is a Continuation-in-Part of application Ser. No. 09/493,617 filed on Jan. 28, 2000.

BACKGROUND OF THE INVENTION

1. Field of the Invention

The present invention is related to a control circuit for a heat-dissipation fan dissipating heat from an electronic device and more particularly to a control circuit for a heat-dissipation fan which can efficiently improve power savings and extend the usable life of the fan.

2. Description of the Prior Art

A typical control circuit for controlling the rotational speed of a heat-dissipation fan operates by temperature control. Accordingly, the fan is rotated at full speed to provide higher heat dissipation effect when the ambient temperature of the device reaches a predetermined higher threshold (extremely operating circumstance) and is reduced to a lower speed (usually about 40% of the full speed) when the ambient temperature falls below a pre-determined lower threshold (normal operation). Alternatively, the speed of the fan can be changed linearly between the low speed and the high speed in linear relationship with the change in the ambient temperature. Nevertheless, such a control circuit for the fan still has some drawbacks. The fan requires significant power at all times, since it is running at low speed during times when the ambient temperature is normal or even low. Additionally, this constant use may cause an overload problem or shorten the usable life of the fan. Preferably, the fan should be stopped at low ambient temperatures, thus not wasting energy on cooling when none is needed.

SUMMARY OF THE INVENTION

The primary object of the present invention is to provide a control circuit for a heat-dissipation fan that can efficiently improve power savings and extend the usable life of the fan. The present invention comprises a control circuit for controlling the rotational speed of a heat-dissipation fan for an electronic device, said fan having a permanent magnet and a coil means, said control circuit comprising: a temperature sensing circuit for sensing the ambient temperature of the device and providing a temperature signal related thereto; a comparator circuit for receiving said temperature signal and for comparing said temperature signal with a predetermined threshold and providing a comparison signal related thereto; a circuit for detecting the phase of the fan magnet and for providing a phase signal related thereto; and a drive circuit for receiving said phase signal and said comparison signal and for driving said coil means to control the rotational speed of said fan, when the ambient temperature is above said threshold, to change substantially linearly with respect to the difference between the ambient temperature and the threshold and, when the ambient temperature is below said threshold, to stop the rotation of the fan. Advantageously, the predetermined threshold is chosen to correspond to a fan speed appropriate to dissipate the heat from the device in its normal operating state.

In a preferred embodiment, when the ambient temperature is below the threshold, the fan is driven by the drive means with sufficient energy to put the fan into a non-rotational standby mode, thus improving power savings and extending the usable life of the fan.

Other objectives, advantages and novel features of the invention will become more apparent from the following detailed description and the accompanying drawings.

BRIEF DESCRIPTION OF THE DRAWING

The present invention will now be described in detail with reference to the accompanying drawing herein.

DETAILED DESCRIPTION OF THE PREFERRED EMBODIMENTS

Figure 1:
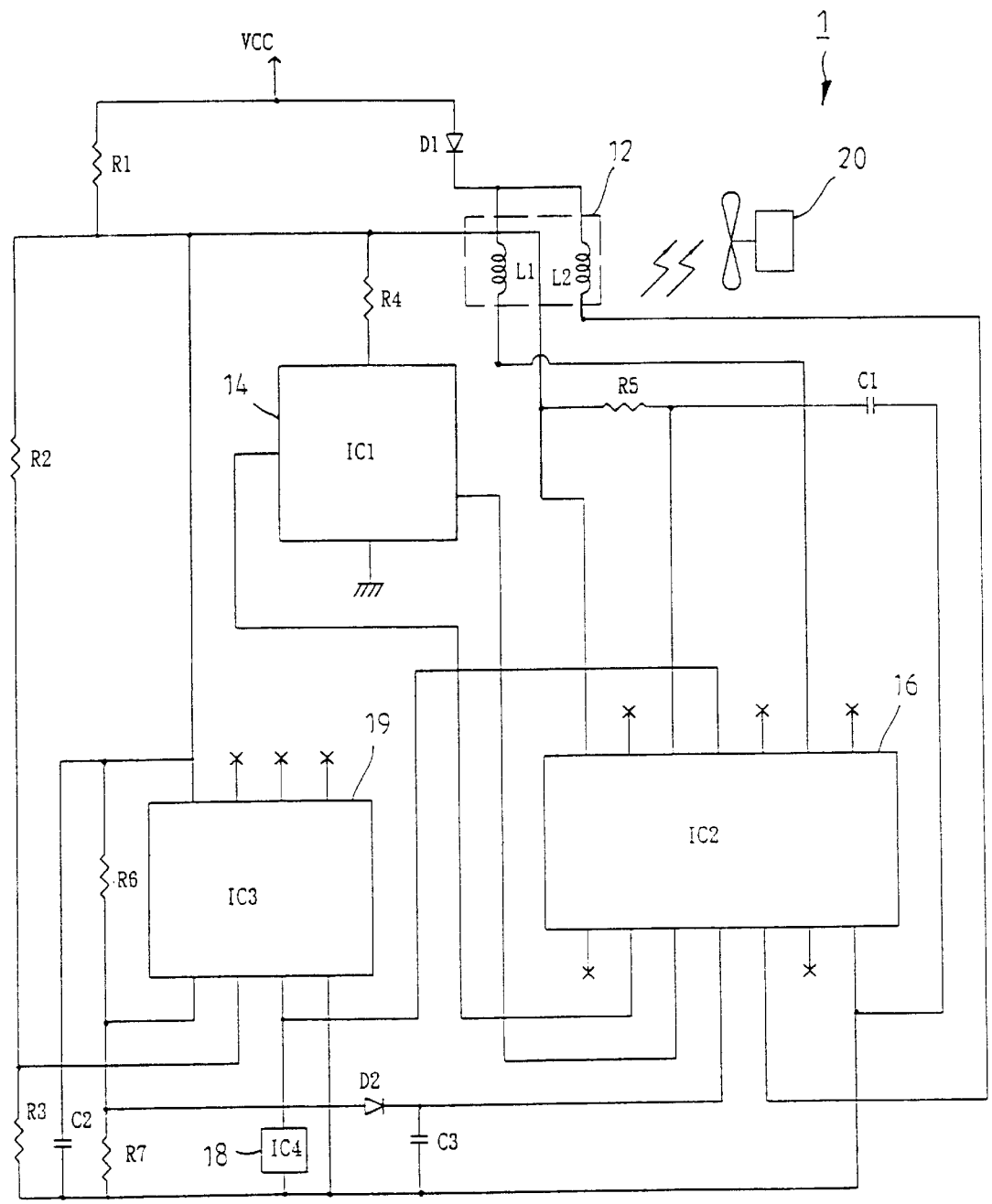
FIG. 1 is a schematic circuit diagram of a control circuit in accordance with the present invention.

Referring to FIG. 1, a control circuit for a heat-dissipation fan in accordance with the present invention is designated by 1 and generally comprises a drive circuit 16, a comparator circuit (a magnifying circuit), a temperature sensing circuit 18 and a Hall IC 14. A power supply (Vcc) 10 powers the control circuit as well as the fan coil means 12. The coil means 12 is electrically controlled by the control circuit 1 and powered to generate an alternating field to drive a rotor of a fan 20 according to control of the drive circuit 16. The Hall IC 14 detects the phase of permanent magnet of the fan 20 and sends a phase signal to the drive circuit 16. The temperature sensing circuit 18 measures the ambient temperature of the electronic device (not shown). The comparator circuit 19 receives a temperature signal from the temperature sensing circuit 18 and sends a comparison signal to drive circuit 16 for driving said coil means 12 to control the rotational speed of the fan. When the ambient temperature of the device is above a predetermined threshold, the speed of the fan is changed substantially linearly with respect to the difference between the ambient temperature and the threshold. Thus, when the measured temperature is increased or decreased, the differential output voltage will be synchronously changed to smoothly increase or decrease the speed of the fan 20 so that it can efficiently dissipate the heat of the electronic device. When the ambient temperature is below the threshold, the rotation of the fan is stopped by drastically decreasing the voltage to the fan 20 to either zero volts or a substantially small voltage. Advantageously, the predetermined threshold is chosen to correspond to a fan speed appropriate to dissipate the heat from the device when the device is in its normal operating state.

In a preferred embodiment, when the ambient temperature drops below the predetermined threshold, the fan is driven by the drive means with sufficient energy to put the fan into a non-rotational standby mode.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A control circuit for controlling the rotational speed of a heat-dissipation fan for an electronic device, said fan having a permanent magnet and a coil, said control circuit comprising:

a temperature sensing circuit for sensing the ambient temperature of the device and providing a temperature signal related thereto;

a comparator circuit for receiving said temperature signal and for comparing said temperature signal with a predetermined threshold and providing a comparison signal related thereto;

a circuit for detecting the phase of the fan magnet and for providing a phase signal related thereto;

a drive circuit for receiving said phase signal and said comparison signal and for driving said coil to control the rotational speed of said fan, when the ambient temperature is above said threshold, to change substantially linearly with respect to the difference between the ambient temperature and the threshold and, when the ambient temperature is below said threshold, to stop the rotation of the fan.

2. A control circuit in accordance with claim 1, wherein said predetermined threshold is chosen to correspond to a fan speed appropriate to dissipate the heat from the device in its normal operating state.

3. A control circuit in accordance with claim 1, further comprising driving said coil with said drive when the ambient temperature is below said threshold with sufficient energy to put the fan in a non-rotational standby mode.

4. A control circuit in accordance with claim 1, wherein the circuit for detecting the phase of the fan magnet and for providing a phase signal related thereto is a Hall integrated circuit.

* * * * *